United States Patent
Kim et al.

(10) Patent No.: US 8,204,081 B2
(45) Date of Patent: Jun. 19, 2012

(54) APPARATUS AND METHOD FOR INSERTING OR EXTRACTING NETWORK TIMESTAMP

(75) Inventors: Nac-woo Kim, Seoul (KR); Byung-tak Lee, Gyeonggi-do (KR); Byong-kwon Moon, Gwangju-si (KR); Seung-hun Oh, Gwangju-si (KR); Seok-kap Ko, Gwangju-si (KR); Sim-kwon Yoon, Gwangju-si (KR); Jai-sang Koh, Gwangju-si (KR)

(73) Assignee: Electronics and Telecommunications Research Institute (KR)

( * ) Notice: Subject to any disclaimer, the term of this patent is extended or adjusted under 35 U.S.C. 154(b) by 275 days.

(21) Appl. No.: 12/604,353

(22) Filed: Oct. 22, 2009

(65) Prior Publication Data
US 2010/0135325 A1 Jun. 3, 2010

(30) Foreign Application Priority Data
Nov. 28, 2008 (KR) .................. 10-2008-0120133

(51) Int. Cl.
*H04J 3/24* (2006.01)
(52) U.S. Cl. ..................................... 370/474
(58) Field of Classification Search .................. None
See application file for complete search history.

(56) References Cited

U.S. PATENT DOCUMENTS

| | | | |
|---|---|---|---|
| 7,991,014 B2 * | 8/2011 | Lockridge et al. | 370/498 |
| 2004/0190459 A1 * | 9/2004 | Ueda et al. | 370/252 |
| 2004/0257469 A1 | 12/2004 | Compton et al. | |
| 2005/0036512 A1 * | 2/2005 | Loukianov | 370/469 |
| 2005/0169269 A1 * | 8/2005 | Tomita | 370/389 |
| 2006/0088063 A1 * | 4/2006 | Hartung et al. | 370/498 |
| 2007/0076764 A1 * | 4/2007 | Kawada et al. | 370/503 |
| 2010/0046552 A1 | 2/2010 | Jung et al. | |

FOREIGN PATENT DOCUMENTS

| | | |
|---|---|---|
| JP | 2004-304809 | 10/2004 |
| KR | 1020080068520 A | 7/2008 |
| WO | WO 2006/040320 A1 | 4/2006 |

OTHER PUBLICATIONS

Yamaguchi, Tetsuya, et al., "IP Broadcasting Technology for Next-generation IPTV," *NTT Technical Review*, vol. 4, No. 10, NTT Cyber Solutions Laboratories, Yokosuka-shi, Japan, Oct. 2006, pp. 43-48.

* cited by examiner

*Primary Examiner* — Min Jung
(74) *Attorney, Agent, or Firm* — Blakely, Sokoloff, Taylor & Zafman

(57) ABSTRACT

Disclosed is a system of transporting multimedia based on network, and more particularly, to an apparatus for inserting, transporting and extracting a timestamp through a network protocol. A network timestamp is transported without changing a preset transport standard such as a UDP, an RTP and a MPEG-2 standard by adding a packet having a timestamp, which is used to compensate for network jitter and used for synchronization, to a packet stream transported through a UDP or an RTP.

6 Claims, 6 Drawing Sheets

APPARATUS AND METHOD FOR INSERTING OR EXTRACTING NETWORK TIMESTAMP

CROSS-REFERENCE TO RELATED APPLICATION

This application claims the benefit under 35 U.S.C. §119(a) of Korean Patent Application No. 10-2008-0120133, filed on Nov. 28, 2008, the disclosure of which is incorporated by reference in its entirety for all purposes.

BACKGROUND

1. Field

The following description relates to a system of transporting multimedia data based on network, and more particularly, to an apparatus and a method for inserting, transporting and extracting a timestamp through a network protocol.

2. Description of the Related Art

A data format for a Motion Picture Expert Group (MPEG) system standard widely used in compressing and transporting digital images is classified into a program stream (PS) format and a transport stream (TS) format. The PS format is used on storage media having few transmission errors, and the TS format is used in a network based digital broadcasting and multimedia stream transport system.

In a network based multimedia transport system, a timestamp represents time indicating information and is used to compensate for network jitter or to synchronize a transmitting party and a receiving party. In the network based multimedia transport system, in general, the timestamp is mainly inserted through two schemes. In one of the schemes, a 4-bytes timestamp is inserted at the beginning of a header of a MPEG-2 TS packet to be transported. The other scheme is realized through a real time transport protocol (RTP), in which respective timestamps of seven MPEG2-TS packets carried in an RTP payload are included in an RTP header.

However, in the case that multimedia is transported through the former one, the MPEG2-TS format needs to be modified and a new system supporting such a new header needs to be built. The former one is offered based on the RTP, but most of the transport stream in a network rarely uses the RTP.

SUMMARY

Accordingly, in one aspect, there is provided an apparatus and a method for inserting a network timestamp, capable of effectively inserting a network timestamp inside a network based multimedia stream without changing a preset transport standard.

In another aspect, there is provided an apparatus and a method for extracting a network timestamp, capable of extracting a network timestamp from a multimedia stream transported is using a network protocol, wherein the network timestamp is used to compensate for network jitter and used for synchronization between a transmitting party and a receiving party.

In one general aspect, there is provided a network timestamp inserting apparatus. The network timestamp inserting apparatus includes a timestamp generator to generate a timestamp used to compensate for network jitter or used for synchronization between a transmitting party and a receiving party, and a packetizer to generate a user datagram protocol (UDP) packet or a real time transport protocol (RTP) packet, each of which includes a plurality of transport stream (TS) packets and a timestamp.

The packetizer is configured to generate one or more UDP packet having a plurality of TS packets and a UDP packet having the timestamp and insert the UDP packet having the timestamp between the UDP packets having the TS packets, or the packetizer is configured to generate one or more RTP packet having a plurality of TS packets and a RTP packet having the timestamp and insert the RTP packet having the timestamp between the RTP packets having the TS packets.

The packetizer generates and inserts the UDP packet having the timestamp or the RTP packet having the timestamp at regular time intervals.

The UDP packet having the timestamp includes a UDP header section, a type section which is used for distinguishing the UDP packet having the timestamp from other UDP packet without the timestamp, a timestamp section and a section for indicating the timestamp section, and wherein the RTP packet having the timestamp includes an RTP header section, a type o section, which is used for distinguishing the RTP packet having the timestamp from other RTP packet without the timestamp, a timestamp section and a section for indicating the timestamp section of the RTP packet. The timestamp includes Program Clock Reference (PCR) information representing a network timestamp indicating time at which a transportation of stream occurs.

In another general aspect, there is provided an apparatus for extracting a network timestamp from a user datagram protocol (UDP) packet stream or a real time protocol (RTP) packet stream. The apparatus includes a depacketizer, which is configured to depacketize the UDP packet stream or the RTP packet stream and divide the UDP packet stream or the RTP packet stream into a transport stream (TS) packet and a packet having the timestamp, and a timestamp extractor configured to extract the timestamp from the packet having the timestamp, wherein the timestamp is used to compensate for network jitter or used for synchronization between a transmitting party and a receiving party.

The timestamp extractor extracts program clock reference (PCR) information indicating network time from the packet having the timestamp.

In another general aspect, there is provided a network timestamp inserting method. The method includes generating a timestamp used to compensate for network jitter or used for synchronization between a transmitting party and a receiving party, and packetizing transport stream (TS) packets into at least one user datagram protocol (UDP) packet or at least one real time transport protocol (RTP) packet into which a packet having the timestamp is inserted.

The packet having the timestamp is an individual packet inserted between the UDP packets or the RTP packets.

The packet having the timestamp is inserted between the TS packets forming the UDP packet or between the TS packets forming the RTP packet. In another general aspect, there is provided a network timestamp extracting method.

The method includes separating a packet having a timestamp from a transport stream (TS) packet by depacketizing a user datagram protocol (UDP) packet stream or an real time transport protocol (RTP) packet stream, and extracting the timestamp from the packet having the timestamp, wherein the timestamp is used to compensate for network jitter and used for synchronization between a transmitting party and a receiving party.

According to the present invention, a network timestamp can be transported without changing a preset transport standard such as a UDP, an RTP and a MPEG-2 standard by adding a packet having a timestamp, which is used to compensate for network jitter and perform synchronization, to a packet stream transported through a UDP or an RTP.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
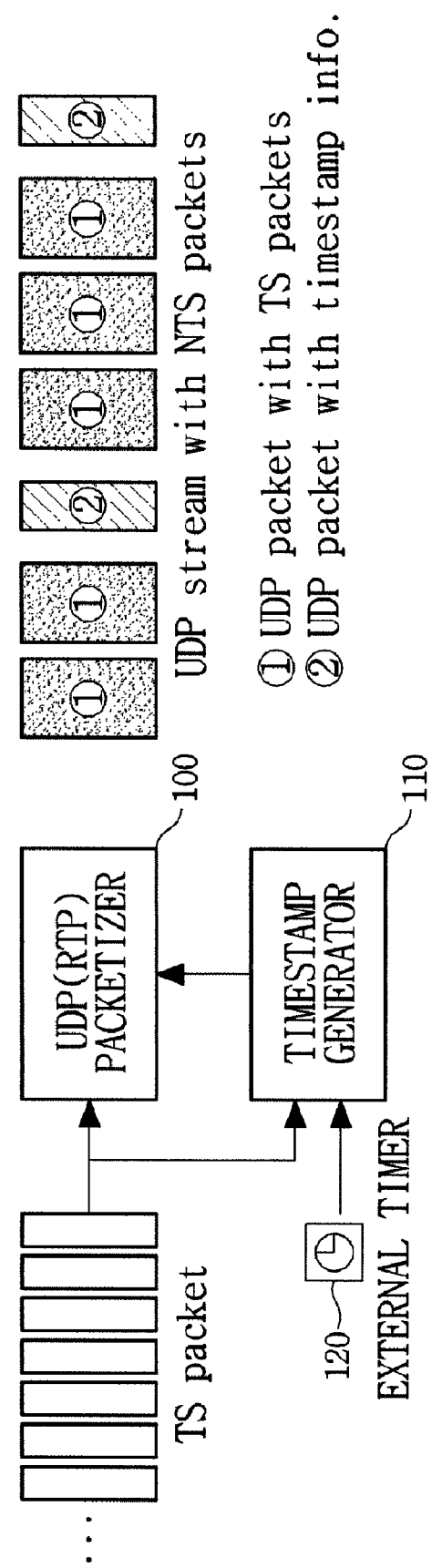
FIG. 1 is a block diagram illustrating an exemplary apparatus for inserting a network timestamp.
Figure 2:
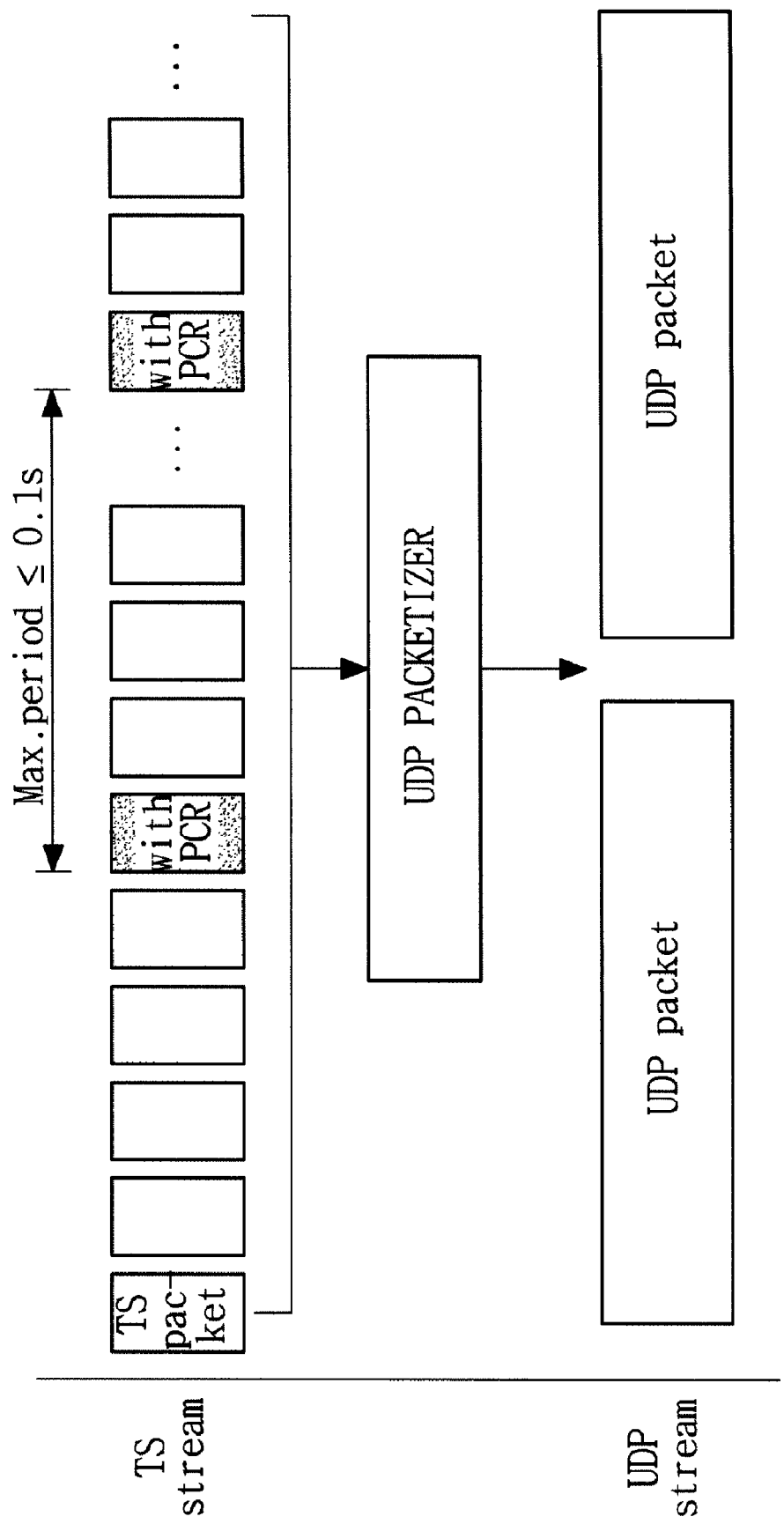
FIG. 2 is a view illustrating an exemplary UDP packet stream generated by the timestamp inserting apparatus shown in FIG. 1.
Figure 3:
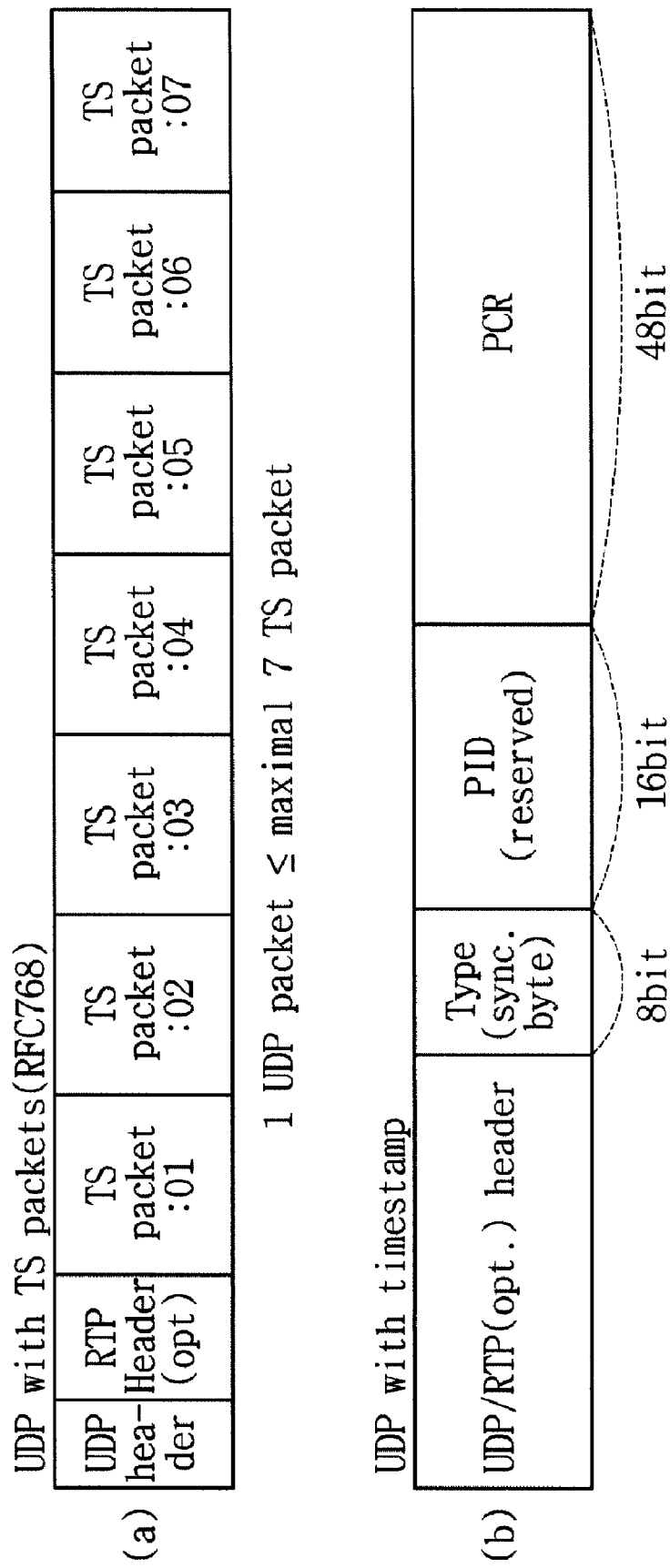
FIG. 3 is a view illustrating the UDP packet stream of FIG. 2 in detail.

FIG. 1 is a block diagram illustrating an exemplary apparatus for inserting a network timestamp, FIG. 2 is a view illustrating an exemplary UDP packet stream generated by the timestamp inserting apparatus shown in FIG. 1, and FIG. 3 is a view illustrating the UDP packet stream of FIG. 2 in detail.

As shown in FIG. 1, an exemplary apparatus for inserting a network timestamp is included in a multistream transport system for transporting multiple streams over network. The multistream transport system includes an encoder for performing compression-coding on multimedia data to be transported, a multiplexer to form a transport stream (hereinafter, referred to as 'TS') packet by performing a multiplexing on image data and sound data that have been subjected to a compression-coding, and a network interface to transport a UDP packet ① or an RTP packet, which are generated by the network timestamp inserting apparatus, through a network.

As shown in FIG. 1, the network timestamp inserting apparatus includes a timestamp generator 110, which is configured to generate timestamp information used to compensate for network jitter or used for synchronization between a transmitting party and a receiving party, and a packetizer 100 to generate a UDP packet ① (or an RTP packet) having the TS packets generated by the multiplexer and a UPD packet ② (or an RTP packet) having the timestamp information generated by the timestamp generator 110. For example, the timestamp generator 110 may be a Program Clock Reference (PCR) inserter generating PCR information which reports network time information indicating time at which stream transportation starts.

Hereinafter, an operation of the network timestamp inserting apparatus will be described with reference to FIGS. 2 and 3. The following description will be made in relation to the UDP packet.

First, differently from a conventional transport scheme, in which compressed images are first converted into TS packets and then converted into UDP packets ① and ②, in the exemplary network timestamp inserting apparatus, the packetizer 100 converts timestamp information indicating time, at which a transportation of multimedia starts, in the form of a PCR information and then transports the PCR information separately from the UDP packets ①. As shown in FIG. 2, the packetizer 100 receives the TS packets from the multiplexer to generate a UDP packet stream, in which the UDP packet (②, in FIG. 1) having timestamp information is inserted between the UDP packets (①, in FIG. 1). The packetizer 100 generates and inserts the UDP packet (②, in FIG. 1) at intervals of 0.1 s or less.

As shown in FIG. 2, TS packets, which have been transferred from the multiplexer, include TS packets having PCR information. The timestamp generator 110 performs interpolation on the PCR information placed at a time interval of 0.1 second by referring to a current time of an external timer (120, in FIG. 1) such that the PCR information has a time interval corresponding to a time interval of a network layer, in which the time interval of the network is smaller than 0.1 second. In this manner, the PCR information is provided to the packetizer 100. Accordingly, the UDP packet ② having timestamp information is generated and inserted between the UDP packets ①. Such a UDP packet ② having timestamp information is periodically or non-periodically inserted between the UDP packets ①. In addition, the UDP packet ② having timestamp information may be transported through a port the same as a port for transmitting multimedia stream, or may be transmitted through a different port.

The UDP packet stream generated by the network timestamp inserting apparatus is transported to a transmitting party through a link layer and a physical layer.

FIG. 3 is a view illustrating the UDP packet generated through the packetizer (100, in FIG. 1) in detail. The UDP packet (a) includes seven MPEG2-TS packets or less. The UDP packet (b) having timestamp information includes a UDP header section and a payload section having a length of 72 bits. The payload section includes a type section, which has a length of 8 bits and is used for distinguishing the UDP packet having timestamp information from other UDP packets, a PCR section having a length of 48 bits, and a packet identifier (PID) section which has a length of 16 bits and is used for indicating the PCR section. For example, 8-bits type information serves as a sync byte of the MPEG2-TS but has a value different from that of the sync byte. In addition, 16-bits PID information has a value corresponding to a value reserved in the TS packets. 48-bits PCR information is used to report network time information indicating time at which transportation starts. 13-bits PID information and 42-bits PCR information are used and the remaining is set into a value of 0.

Hereinafter, an apparatus for extracting network timestamp from the UDP packet stream will be described.

Figure 4:
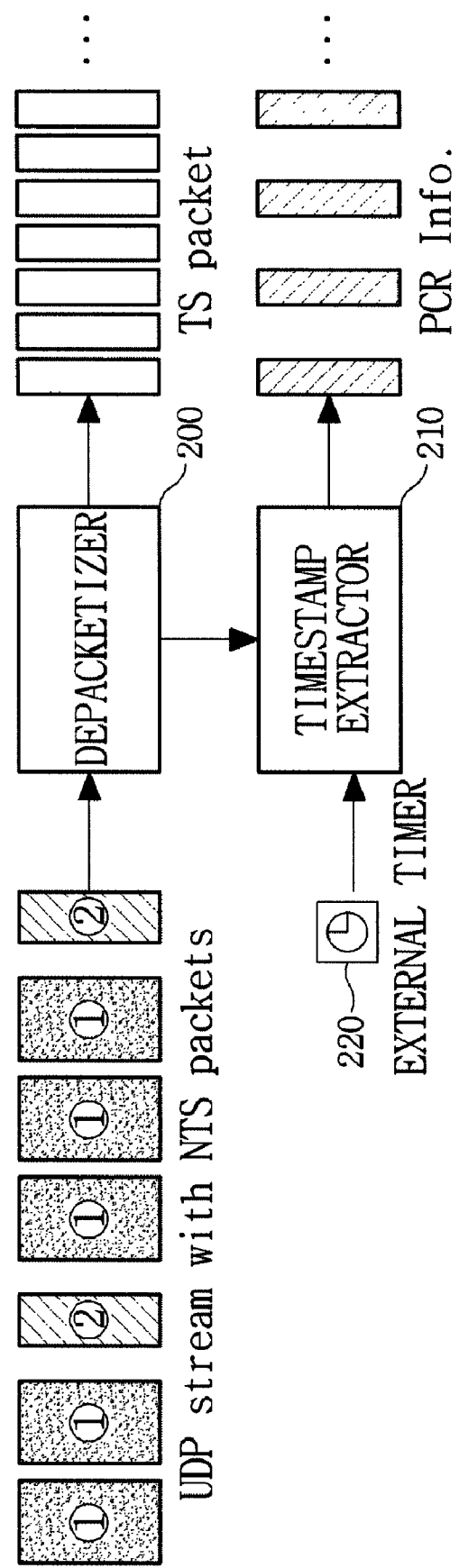
FIG. 4 is a block diagram illustrating an exemplary apparatus for extracting a network timestamp.

FIG. 4 is a block diagram illustrating an exemplary apparatus for extracting a network timestamp. The following description will be made in relation to the UDP packet. The network timestamp extracting apparatus includes a depacketizer 200, which depacketizes the UDP packet stream (or RTP packet stream) and then divides the UDP packet stream into the UDP packet ① having TS packets and the UDP packet ② having timestamp information, and a timestamp extractor 210, which extracts timestamp information from the UDP packet ② having timestamp information.

As shown in FIG. 4, the UDP packet stream transported over a network includes the UDP packets ① having TS packets and the UDP packets ② having timestamp information. If such a UDP packet stream is transferred to the depacketizer 200, the depacketizer 200 depacketizes the UDP packet stream to divide the UDP packet stream into the UDP packets ① having TS packets and the UDP packets ② having timestamp information. After that, the timestamp extractor 210 extracts the PCR information from the UDP packets ② having timestamp information. The PCR information extracted through the above scheme is used to compensate for network jitter or used for synchronization between a transmitting party and a receiving party.

According to the exemplary network timestamp inserting apparatus, since the packet, which has timestamp information used to compensate for network jitter or used for synchronization, is added to the packet stream to be transported through UDP or RTP, the network timestamp can be effectively transported without changing a preset transport standard (UDP/RTP/MPEG2-TS).

In the previous embodiment, a packet having timestamp information is formed into an individual UDP packet. However, according to the present embodiment, one of seven TS s packets included in a UDP packet is removed and a packet having timestamp information is added in the UDP packet instead of the removed TS packet. Hereinafter, such a UDP packet will be described in detail with reference to FIG. 5.

Figure 5:
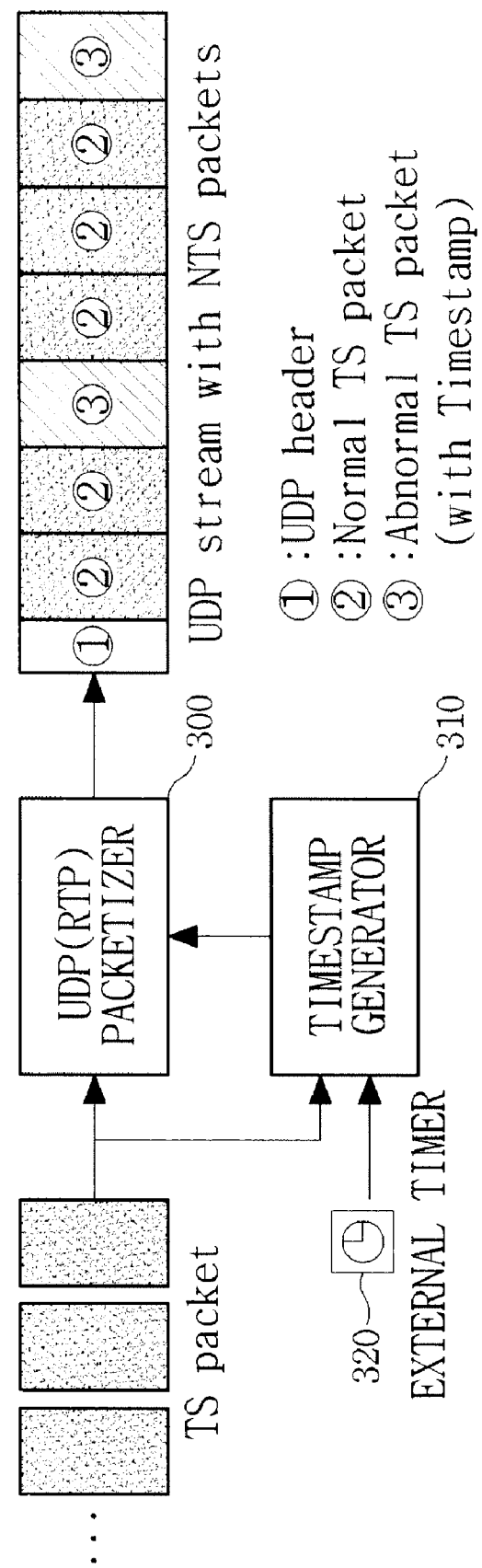
FIG. 5 is a block diagram illustrating another exemplary apparatus for inserting a network timestamp.
Figure 6:
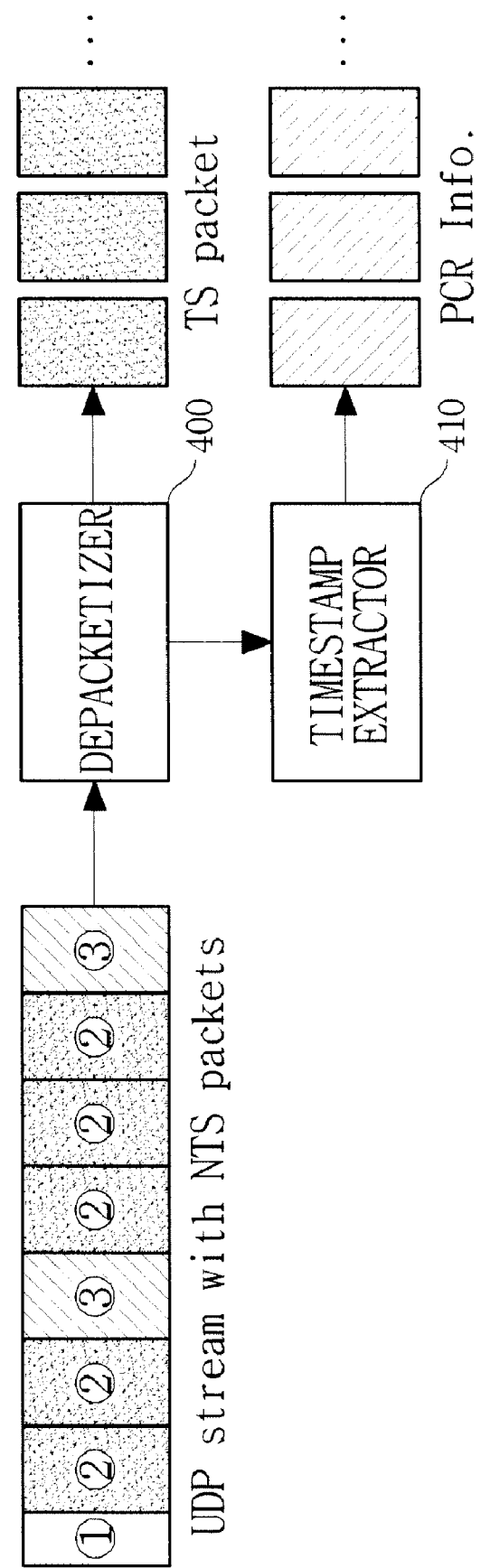
FIG. 6 is a block diagram illustrating an exemplary apparatus for extracting a network timestamp.

FIG. 5 is a block diagram illustrating another exemplary apparatus for inserting a network timestamp, and FIG. 6 is a block diagram illustrating an exemplary apparatus for extracting a network timestamp.

A packetizer 300 shown in FIG. 5 generates a UDP packet including a plurality of TS packets ② and at least one TS packet ③ having timestamp information generated by a timestamp generator 300. Such a UDP packet has a header ① at the beginning thereof. The TS packet ③ having timestamp information includes a type section, a PID section and a PCR is section.

That is, the packetizer 300 receives TS packet from a multiplexer to generate a UDP packet stream (or an RTP packet stream). A single UDP packet contained in the UDP packet stream or a single RTP packet contained in the RTP packet stream includes a plurality of TS packets ② and the TS packets ③ having timestamp information. The TS packets ③ having timestamp information is inserted between the TS packets ②. Such a UDP packet is transported to a receiving party through a link layer and a physical layer.

As shown in FIG. 6, another exemplary apparatus for extracting a timestamp includes a depacketizer 400 and a timestamp extractor 410 that are placed at an intermediate node or an end node in network. The timestamp information is extracted from the UDP packet by using the depacketizer 400 and the timestamp extractor 410. If the UDP packet stream is input to the depacketizer 400, the depacketizer 400 depacketizes the UDP packet stream and then divides the UDP packet stream into the TS packets ② and the TS packets ③ having timestamp information. After that, the timestamp extractor 410 extracts PCR information from the TS packets ③ having timestamp information. The extracted PCR information is used to compensate for network jitter or used for synchronization between a transmitting party and a receiving party.

According to the exemplary network timestamp inserting apparatus, since the timestamp information, which is used to compensate for network jitter or used for synchronization between a transmitting party and a receiving party, is included in the packet to be transported through o UDP or RTP, the network timestamp can be effectively transported without changing a preset transport standard (UDP/RTP/MPEG2).

A number of exemplary embodiments have been described above. Nevertheless, it will be understood that various modifications may be made. For example, suitable results may be achieved if the described techniques are performed in a different order and/or if components in a is described system, architecture, device, or circuit are combined in a different manner and/or replaced or supplemented by other components or their equivalents. Accordingly, other implementations are within the scope of the following claims. For example, a method of inserting a network timestamp under a network based multimedia stream transport environment includes generating a timestamp used to compensate for network jitter or used for synchronization between a transmitting party and a receiving party, and packetizing transport stream (TS) packets into at least one user datagram protocol (UDP) packet or at least one real time transport protocol (RTP) packet into which a packet having the timestamp is inserted. Thus, a network timestamp is effectively transported without changing a preset transport standard of a system such as UDP/RTP/MPEG2.

After the network timestamp included in a UDP packet stream or an RTP packet stream has been transferred to a receiving party through the above scheme, the UDP packet stream or the RTP packet stream is depacketized and then divided into the TS packets and the packet having timestamp information at a receiving party. After that, the timestamp, which is used to compensate for network jitter or used for synchronization between a transmitting party and a receiving party, is extracted from the packet with timestamp. In this manner, the timestamp is effectively extracted.

What is claimed is:

1. A network timestamp inserting apparatus in a network based multimedia stream transport system, the apparatus comprising:
    a timestamp generator to generate a timestamp used to compensate for network jitter or used for synchronization between a transmitting party and a receiving party; and
    a packetizer to generate a user datagram protocol (UDP) packet or a real time transport protocol (RTP) packet, each of which includes a plurality of transport stream (TS) packets and a timestamp; and
    wherein the packetizer is configured to generate one or more UDP packet having a plurality of TS packets and a UDP packet having the timestamp and insert the UDP packet having the timestamp between the UDP packets having the TS packets, or the packetizer is configured to generate one or more RTP packet having a plurality of TS packets and a RTP packet having the timestamp and insert the RTP packet having the timestamp between the RTP packets having the TS packets.

2. The apparatus of claim 1, wherein the packetizer generates and inserts the UDP packet having the timestamp or the RTP packet having the timestamp at regular time intervals.

3. The apparatus of claim 1, wherein the packetizer generates and inserts the UDP packet having the timestamp or the RTP packet having the timestamp at a maximum time interval of 0.1 seconds.

4. The apparatus of claim 1, wherein the UDP packet having the timestamp includes a UDP header section, a type section which is used for distinguishing the UDP packet having the timestamp from other UDP packet without the timestamp, a timestamp section and a section for indicating the timestamp section, and wherein the RTP packet having the timestamp includes an RTP header section, a type section, which is used for distinguishing the RTP packet having the timestamp from other RTP packet without the timestamp, a timestamp section and a section for indicating the timestamp section of the RTP packet.

5. The apparatus of claim 4, wherein the timestamp includes Program Clock Reference (PCR) information representing a network timestamp indicating time at which a transportation of stream occurs.

6. The apparatus of claim 4, wherein the type section, the timestamp section and the section for indicating the timestamp section respectively correspond to 8bits of a payload, 48bits of a payload and 16bits of a payload.

* * * * *